G. POULOS.
MILK DISPENSING APPARATUS.
APPLICATION FILED MAR. 12, 1918.
1,306,313.
Patented June 10, 1919.
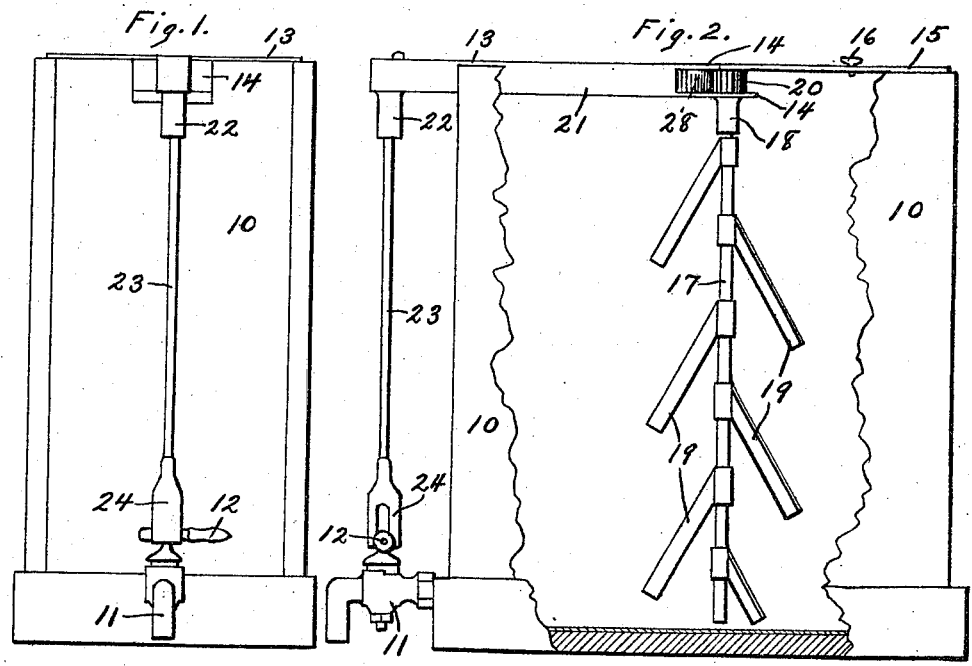
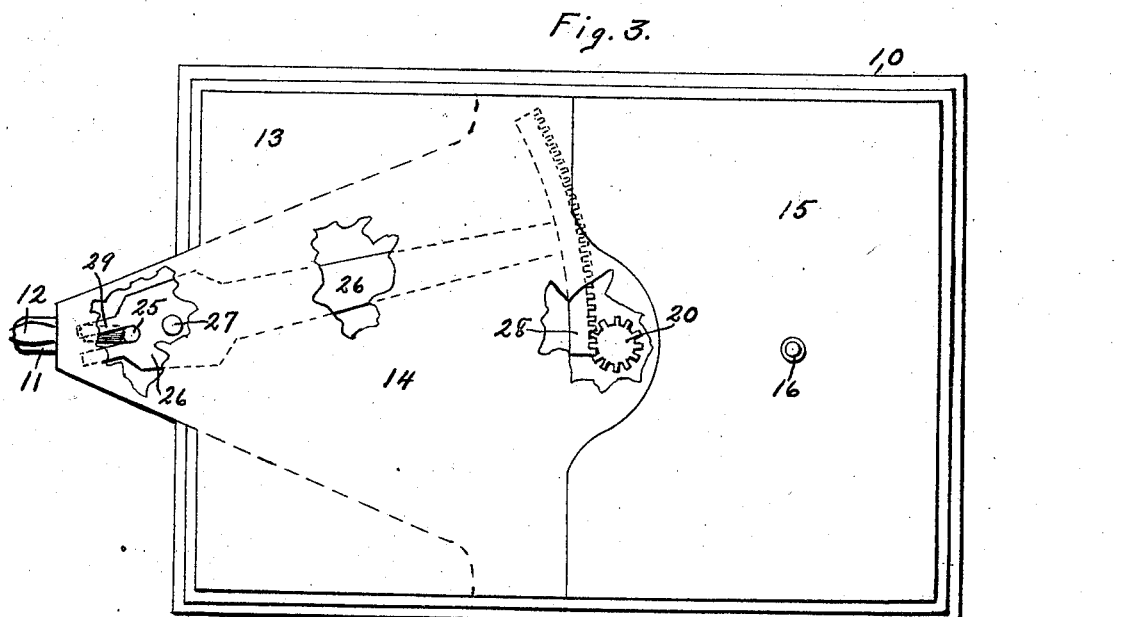
INVENTOR.
GUS POULOS
BY
ATTORNEY.

UNITED STATES PATENT OFFICE.

GUS POULOS, OF PERRY, IOWA.

MILK-DISPENSING APPARATUS.

1,306,313.           Specification of Letters Patent.      Patented June 10, 1919.

Application filed March 12, 1918. Serial No. 222,030.

*To all whom it may concern:*

Be it known that I, GUS POULOS, a subject of the King of Greece, and resident of the United States of America, at Perry, in the county of Dallas and State of Iowa, have invented a new and useful Milk-Dispensing Apparatus, of which the following is a specification.

The object of this invention is to provide an improved construction for a milk-dispensing apparatus in which means is provided for automatically agitating and stirring the milk whenever the spigot is opened to withdraw milk from the receptacle, to the end of thoroughly commingling cream and butter-fat with the body of milk.

A further object of this invention is to provide means in a milk-dispensing apparatus for insuring that any quantity of milk dispensed shall contain the full content of richness possessed by the body of milk in the receptacle.

A further object of this invention is to provide improved means automatically actuated by an opening movement of the spigot of a milk-dispensing receptacle for agitating and throwing downwardly in the receptacle any cream or particles of fat carried by the body of milk therein.

A further object of this invention is to provide an improved agitating mechanism for a milk-dispensing receptacle which is readily removable therefrom to permit thorough cleaning of the receptacle.

My invention consists in the construction, arrangement and combination of elements hereinafter set forth, pointed out in my claims and illustrated by the accompanying drawing, in which—

Figure 1 is a front elevation of a milk-dispensing apparatus embodying my invention, the spigot being shown in closed position. Fig. 2 is a side elevation of the same, partly in section, a portion being broken away to reveal interior construction. Fig. 3 is a plan, on an enlarged scale, the spigot being shown in open position, portions being broken away to reveal interior construction.

In the construction of the apparatus as shown the numeral 10 designates a tank or receptacle adapted to contain milk to be dispensed, which receptacle may be of any desired size and shape and equipped with a spigot 11 for withdrawing the fluid therefrom. The spigot 11 is provided with a valve having an operating handle 12 adapted for oscillation on a vertical axis.

A forward cover member 13 is provided for the forward portion of the receptacle 10 and a supporting plate 14 is formed integrally with said cover member and in its central portion projects forwardly beyond the forward margin of said receptacle. A cover member 15 is provided for the rear portion of the receptacle and has a knob 16, and said member 15 coöperates with the member 13 to provide a separable and removable cover for the receptacle; the rear cover member 15 being removable for replenishing or inspecting the contents of the receptacle, and both of said cover members being removable when it is desired to clean the device.

An agitator shaft 17 is mounted for rotary oscillation substantially centrally of the receptacle 10 and has its upper end portion journaled in a bearing 18 carried by the supporting plate 14, the shaft being entirely supported by and depending from said plate. A plurality of agitating blades 19 are fixed, preferably in staggered relations, to and extend outwardly and downwardly from the shaft 17. A pinion 20 is fixed to the upper end of the shaft 17. The supporting plate 14 preferably is formed of two parallel members connected by a peripheral flange 21, whereby a housing is formed inclosing the pinion 20 and other members hereinafter described.

A bearing 22 is formed on and projects downwardly from the projecting forward portion of the supporting plate 14 and a shaft 23 is journaled in said bearing and is mounted for rotary oscillation outside of the receptacle and parallel with the agitator shaft 17. The lower end of the shaft 23 is formed with a vertical fork 24 adapted to engage the handle 12 of the spigot and be turned therewith to oscillate said shaft. The upper end of the shaft 23 is formed with a crank 25 lying within the housing formed by the flanged supporting plate. A lever 26 is mounted in horizontal position within the housing formed by the flanged supporting plate 14 and is fulcrumed on a pin or bolt 27 carried by said housing, one arm of said lever being materially longer than the other. The longer arm of the lever 26 carries on its end a segmental rack 28 meshing with and adapted to rotate the pinion 20 and agitating devices. The opposite or short arm of the lever 26 is formed with an end-opening fork 29 loosely embracing the crank 25 of the shaft 23.

In use the handle 12 of the spigot 11 normally is turned laterally as shown in Figs. 1 and 2 to close said spigot. When it is desired to withdraw liquid from the receptacle the handle 12 is turned a quarter turn to forwardly projecting position, as shown in Fig. 3, which results in an oscillation of the crank shaft 23 through the embracing relation of the yoke 24 with said handle. Such oscillation of the crank shaft 23 results in an oscillation of the lever 26, through the connection of the crank 25 with the fork 29, and rotation of the agitating devices in the receptacle through the rack 28 and pinion 20. Rotation of the agitating devices results in a thorough agitation of the contents of the receptacle, and the downward inclination of the agitator blades 19 results in a downward flowing of the contents at the center of the receptacle and thus commingles the liquid at the top of the receptacle with the body of liquid therein, to the end of mixing milk, cream and butter fat and producing a mixture of uniform consistency and richness, so that the quantity drawn from the spigot 11 for dispensing possesses its share of richness. Owing to the advantage of leverage possessed by the long arm of the lever 26, the pinion 20 and agitating devices may be given several complete revolutions by a quarter turn of the handle 12. When the handle 12 is returned to closing position the devices are returned to their normal positions.

The operating and agitating means may be lifted away with the cover members so that access may be had to the interior of the receptacle for cleaning it, and so that the agitating means may be cleaned.

Any desired means may be employed for operatively connecting the agitating devices to the spigot handle so that said devices are operated when the spigot is opened, thus insuring that the liquid drawn for dispensing each time is properly agitated and possesses its proportionate share of the richness of the body of fluid contained in the receptacle.

The agitating blades 19 preferably are flanged or curved laterally on their outer margins, and forwardly relative to the direction of rotation of said blades in the opening movement of the spigot handle, so as to effect a downward movement of fluid such as milk or buttermilk encountered by said blades in such movement.

I claim as my invention—

1. In a dispensing apparatus having a tank, a spigot mounted externally of said tank and an agitating device mounted internally of said tank, the combination with said agitating device and spigot of a shaft vertically arranged externally of said tank, and operative connections between said shaft and the agitating device, said shaft being formed at its lower end with a bifurcation adapted to be removably engaged with the handle of said spigot.

2. In a dispensing apparatus having a tank, a removable cover therefor, an agitating device depending from said cover, and a spigot arranged externally of the tank, the combination with said agitating device and spigot of a shaft vertically arranged externally of said tank and supported by said cover, and operative connections between said shaft and the agitating device, the lower end of said shaft being forked to engage the handle of said pigot.

3. A dispensing apparatus, comprising a tank having a spigot, a removable cover for said tank, said cover being formed with a portion projecting beyond the forward margin of the tank over said spigot, an agitating device depending from said cover within the tank, a shaft journaled at one end in the projecting portion of said cover and forked at its lower end to engage the handle of said spigot, a lever fulcrumed on said cover member and having one end operatively connected to the upper end of said shaft, a pinion carried by the upper end of said agitating device, and a segmental rack on the opposite end of said lever meshing with said pinion.

4. A dispensing apparatus, comprising a tank having a spigot, a removable cover for said tank, said cover being formed with a portion projecting forwardly of said tank over said spigot, an agitating device depending from said cover within the tank, a shaft journaled in the projecting portion of said cover and detachably connected at its lower end to said spigot, said shaft being formed at its upper end with a crank, a lever fulcrumed on said cover member and having one end forked and loosely engaging the crank on said shaft, and operative connections between the opposite end of said lever and the agitating device.

GUS POULOS.

Copies of this patent may be obtained for five cents each, by addressing the "Commissioner of Patents, Washington, D. C."